(12) United States Patent
Mayeur et al.

(10) Patent No.: US 9,193,919 B2
(45) Date of Patent: Nov. 24, 2015

(54) PROCESS FOR HYDRODEOXYGENATION AND PROCESS FOR UPGRADING OF PYROLYSIS OIL RESULTING FROM BIOMASS, WHICH ARE CAPABLE OF OPERATING CONTINUOUSLY

(75) Inventors: Vincent Mayeur, Honfleur (FR); Alexandre Preau, Puteaux (FR)

(73) Assignee: TOTAL RAFFINAGE MARKETING, Puteaux (FR)

( * ) Notice: Subject to any disclaimer, the term of this patent is extended or adjusted under 35 U.S.C. 154(b) by 236 days.

(21) Appl. No.: 13/878,661

(22) PCT Filed: Nov. 21, 2011

(86) PCT No.: PCT/FR2011/052714
§ 371 (c)(1),
(2), (4) Date: Jun. 7, 2013

(87) PCT Pub. No.: WO2012/066263
PCT Pub. Date: May 24, 2012

(65) Prior Publication Data
US 2013/0255138 A1 Oct. 3, 2013

(30) Foreign Application Priority Data
Nov. 19, 2010 (FR) ...................................... 10 59530

(51) Int. Cl.
*C10G 3/00* (2006.01)
*B01J 8/04* (2006.01)
(Continued)

(52) U.S. Cl.
CPC ................ *C10G 3/50* (2013.01); *B01J 8/0453* (2013.01); *B01J 8/0457* (2013.01); *B01J 8/0496* (2013.01); *C10G 1/02* (2013.01); *C10G 3/42* (2013.01); *C10G 3/45* (2013.01); *C10G 3/46* (2013.01); *C10G 3/47* (2013.01); *C10G 3/48* (2013.01); *C10G 3/49* (2013.01); *C10G 3/60* (2013.01); *C10G 45/72* (2013.01); *C10L 1/00* (2013.01); *B01J 2208/00061* (2013.01);
(Continued)

(58) Field of Classification Search
CPC .............. C10L 1/00; C10G 3/50; C10G 1/02; C10G 3/42; C10G 3/48; C10G 3/49; C10G 3/60; C10G 45/42; C10G 3/45; C10G 3/46; C10G 3/47; C10G 2300/1014; C10G 2300/4006; C10G 2300/4081; B01J 8/0453; B01J 8/0457; B01J 8/0496; B01J 2008/00061; B01J 2208/00548; B01J 2208/025
See application file for complete search history.

(56) References Cited

U.S. PATENT DOCUMENTS 4,707,245 A 11/1987 Baldasarri et al.
5,000,924 A 3/1991 Cygnarowicz et al.
(Continued)

FOREIGN PATENT DOCUMENTS

FR 2 949 233 A1 2/2011
WO 2009/126508 A2 10/2009

OTHER PUBLICATIONS

French Search Report for FR 1059530 dated Apr. 20, 2011.
International Search Report for PCT/FR2011/052714 dated Aug. 16, 2012.

*Primary Examiner* — Cephia D Toomer
(74) *Attorney, Agent, or Firm* — Sughrue Mion, PLLC

(57) ABSTRACT

The invention relates to a process for hydrodeoxygenation (HDO) of pyrolysis oil and also to a process for upgrading of pyrolysis oil implementing said HDO process, and also to processing of the aqueous phase resulting from the HDO by steam pre-reforming and then steam reforming.

23 Claims, 2 Drawing Sheets

Figure 1:
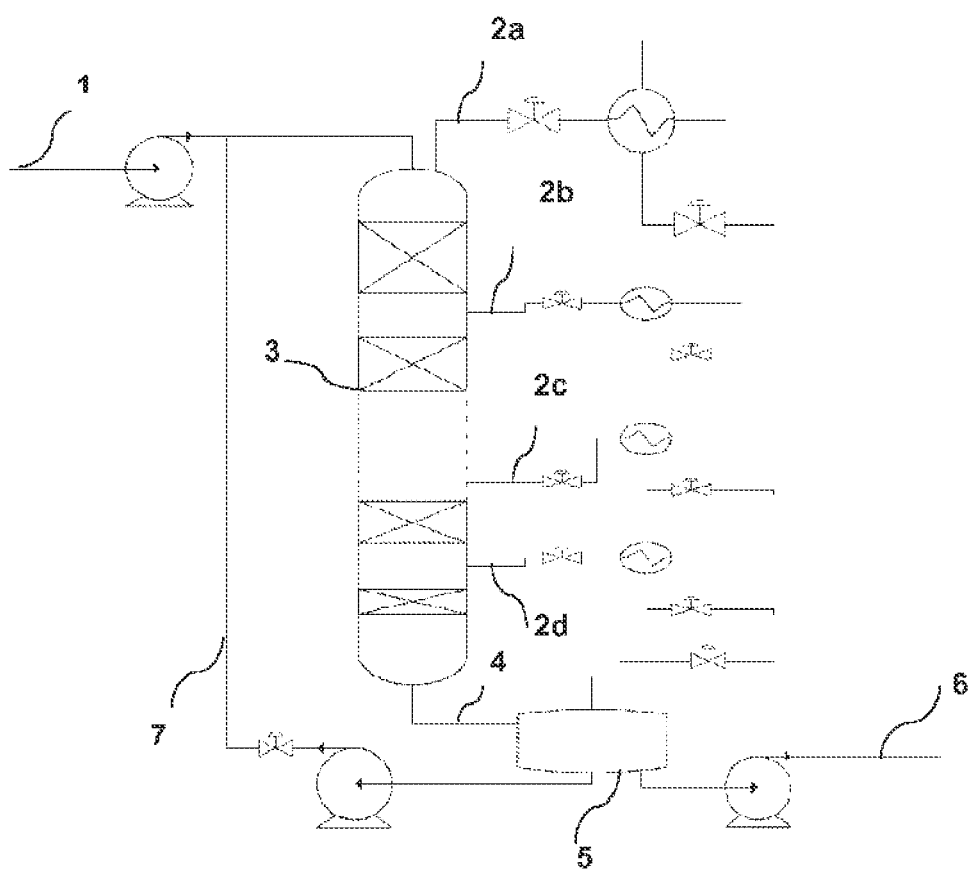

(51) Int. Cl.
*C10G 1/02* (2006.01)
*C10G 45/72* (2006.01)
*C10L 1/00* (2006.01)

(52) U.S. Cl.
CPC .. *B01J 2208/00548* (2013.01); *B01J 2208/025* (2013.01); *C10G 2300/1014* (2013.01); *C10G 2300/4006* (2013.01); *C10G 2300/4081* (2013.01); *C10G 2300/42* (2013.01); *C10G 2400/02* (2013.01); *C10G 2400/04* (2013.01); *C10G 2400/08* (2013.01)

(56) References Cited

U.S. PATENT DOCUMENTS

| | | | |
|---|---|---|---|
| 8,304,592 B2 * | 11/2012 | Luebke | 585/331 |
| 8,314,276 B2 * | 11/2012 | Petri et al. | 585/263 |
| 8,471,079 B2 * | 6/2013 | Brandvold et al. | 585/240 |
| 2007/0010682 A1 | 1/2007 | Myllyoja et al. | |
| 2008/0053870 A1 | 3/2008 | Marker et al. | |
| 2010/0242349 A1 | 9/2010 | Abe et al. | |

\* cited by examiner

PROCESS FOR HYDRODEOXYGENATION AND PROCESS FOR UPGRADING OF PYROLYSIS OIL RESULTING FROM BIOMASS, WHICH ARE CAPABLE OF OPERATING CONTINUOUSLY

CROSS REFERENCE TO RELATED APPLICATIONS

This application is a National Stage of International Application No. PCT/FR2011/052714 filed Nov. 21, 2011, claiming priority based on French Patent Application No. 10 59530 filed Nov. 19, 2010, the contents of all of which are incorporated herein by reference in their entirety.

The invention relates to a process for the hydrodeoxygenation (HDO) of biomass pyrolysis oil capable of operating continuously and to a process for upgrading biomass pyrolysis oil comprising, in a $1^{st}$ stage, said HDO process.

Biomass pyrolysis oils, or bio-oils, result from the pyroliquefaction, also known as low-temperature fast pyrolysis, of a biomass of the following types: wood (deciduous, coniferous), straw, energy crops (short rotation coppice (SRC), very short rotation coppice (VSRC), *Miscanthus*, switchgrass, sorghum, and the like) and forestry or agricultural biomass waste, such as bark, chips, sawdust, bagasse, and the like. These pyrolysis oils thus result from lignocellulose biomass composed of holocelluloses (cellulose, hemicellulose) and lignin.

These pyrolysis oils resulting from biomass are produced by depolymerization and fragmentation of the constituent components of biomass (holocelluloses (cellulose, hemicellulose), lignin) under the action of a rapid increase (<2 seconds) of the temperature to 450° C.-550° C. and of a rapid quenching of the intermediate decomposition products.

They can be regarded as microemulsions in which the continuous liquid phase is an aqueous solution of the decomposition products of cellulose and hemicellulose and small lignin molecules. The continuous liquid phase stabilizes the noncontinuous organic phase essentially composed of pyrolytic lignin macromolecules. These pyrolysis oils are composed of water and of a complex mixture of oxygen-comprising compounds. Their elementary composition is similar to the composition of the starting biomass with in particular a high oxygen content.

The average organic molecular composition which can be analyzed of the pyrolysis oils can in general be described by the families presented in table 1.

TABLE 1

| | Content (% w/w) |
|---|---|
| Pyrolytic lignin | 15-25 |
| Organic acids | 5-15 |
| Aldehydes and hydroxyaldehydes | 5-20 |
| Ketones and hydroxyketones | 0-15 |
| Phenols | 15-35 |
| Methanol, ethanol | 1-5 |

The main characteristics of pyrolysis oils are combined in the following table 2.

TABLE 2

| Properties | | Pyrolysis oils |
|---|---|---|
| pH | | 2.0-3.7 |
| Water content (% w/w) | | 15-35 |

TABLE 2-continued

| Properties | | Pyrolysis oils |
|---|---|---|
| Density at 15° C. (kg/m³) | | 1110-1300 |
| Viscosity at 20° C. (mm²/s) | | 50-130 |
| Viscosity at 40° C. (mm²/s) | | 12-35 |
| Elemental analysis | C | 30-50 |
| (% w/w) | H | 6-9 |
| | O | 40-60 |
| Solid matter (% w/w) | | 0.01-2 |
| Ash (% w/w) | | 0.01-0.20 |
| Gross Calorific Value GCV (MJ/kg) | | 13-19 |
| Metals (K + Na) (mg/kg) | | 10-300 |

Pyrolysis oils are characterized by a high density and a viscosity which can vary as a function, inter alia, of the starting biomass. As they are acids and thus corrosive, their use requires the employment of specific corrosion-resistant materials, such as stainless steel, high density polyethylene, propylene, and the like.

Furthermore, pyrolysis oils are chemically and thermally unstable. The chemical instability of pyrolysis oils is reflected by the change over time in their physicochemical properties (viscosity, water content, solids content, and the like), which can result in a separation into two phases. The thermal instability of pyrolysis oils is reflected by a very rapid change in their properties when they are heated to temperatures greater than 80° C. As a result of this instability, these products cannot be upgraded in a refinery in their crude form, except in a combustion application in return for a few modifications to current plants. For any other application in the refinery, it appears necessary to stabilize pyrolysis oils before use, for example by removal or conversion of the most reactive entities.

Pyrolysis oils generally exhibit an average water content of the order of 25% w/w, an oxygen content of the organic fraction of the order of 35-40% w/w and a molecular structure of great complexity. In addition, their water content can result in a partial phase separation, which has an effect on their other physical properties. Finally, their ash and alkali metal contents can result in the formation of deposits and in the fouling of the plants.

Moreover, due to their hydrophilic nature and their polarity, fast pyrolysis oils are not miscible with hydrocarbons. Thus, pyrolysis oils cannot be upgraded as such in a refinery as a mixture with hydrocarbon fractions of fossil origin.

Due to their specific properties set out above, the use of biomass pyrolysis oils raises numerous problems.

Currently, the main upgrading routes studied are the combustion of biomass pyrolysis oil in boilers or gas turbines in order to produce heat and/or electricity, or the production of bases for the chemical industry.

In order to be able to be used in refineries for the purpose of the production of renewable liquid fuels (or partially renewable liquid fuels, if they are mixed with fuels of fossil origin), biomass pyrolysis oils have to be subjected to a pretreatment targeted at stabilizing them. Such a pretreatment can be a hydrodeoxygenation stage. This hydrodeoxygenation (HDO) can be carried out in particular according to the simplified reaction:

$$C_6H_8O_4 + 4H_2 \rightarrow C_6H_8 + 4H_2O$$

The HDO of pyrolysis oil can be extensive (conversion>90%) or total (conversion=100%), in order to convert bio oils into fuel bases or in order to render them miscible with hydrocarbon fractions of petroleum origin and thus introduce it into the refining scheme.

When the hydrodeoxygenation of pyrolysis oil is partial (for example 50±40%), the products obtained on conclusion of the HDO cannot be incorporated as such into a gasoline pool. Nevertheless, these products can be introduced into existing combustion (boiler) and conversion units known per se (hydrotreating, FCC, visbreaking, carbonization) or can be used as chemical intermediates (acetic acid, phenols, and the like).

The HDO of pyrolysis oil is generally carried out by hydrotreating (HDT), generally performed at a temperature ranging from 150 to 350° C. and a pressure of 10 to 20 MPa in the presence of a catalyst. The use of high pressures promotes the HDO reaction and makes it possible to reduce the rate of the polymerization reactions of pyrolysis oil in comparison with the HDO reactions.

Generally, in the HDO stage, the hydrogen is mixed with the feedstock upstream of the hydrotreating reactor and this mixture is passed through a $1^{st}$ catalytic bed in cocurrent or countercurrent flow.

The hydrodeoxygenation reaction is highly exothermic and difficult to control; phenomena of coking of the catalyst, ranging up to blocking of the reactor, are sometimes observed. It is then necessary to halt the reactor in order to proceed to clean it. See, for example, *Liquid fuels by low-severity hydrotreating of biocrude*, D. C. Elliott & G. G. Neuenschwander, *Developments in Thermochemical Biomass Conversion*, vol. 1, pp. 611-621, A. V. Bridgwater and D. G. B. Boocock, eds., *Blackie Academic & Professional*, London: 1996. Also see *Hydrogen from biomass—production by steam reforming of biomass pyrolysis oil*, S. Czernik et al., CATTOD-5270; page 3.

When an extensive or total HDO of the pyrolysis oil is required, the HDO reaction can be carried out in two reactors in series, each operating adiabatically and isothermally or quasi-isothermally. In this case, the $1^{st}$ reactor can operate at low temperature, typically at a temperature ranging from 120 to 180° C.; the $2^{nd}$ can operate at a higher temperature of 300 to 400° C., preferably at 350° C. See, for example, D. C. Elliott et al., *Pacific Northwest National Laboratory*, Richland, Wash., USA, *Hydrogenation of bio-oil for chemical and fuel production*, pp. 1536-1576.

However, here again, phenomena of coking of the catalyst or catalysts are observed, which do not make possible continuous operation of the HDO of the pyrolysis oil.

The pyrolysis oil HDO reactors of the prior art are isothermal reactors comprising one or more fixed or nonfixed catalytic beds.

FIG. 1 gives a representation of a simplified scheme for the operation of the process according to the present invention using and HDO reactor.

Figure 2:
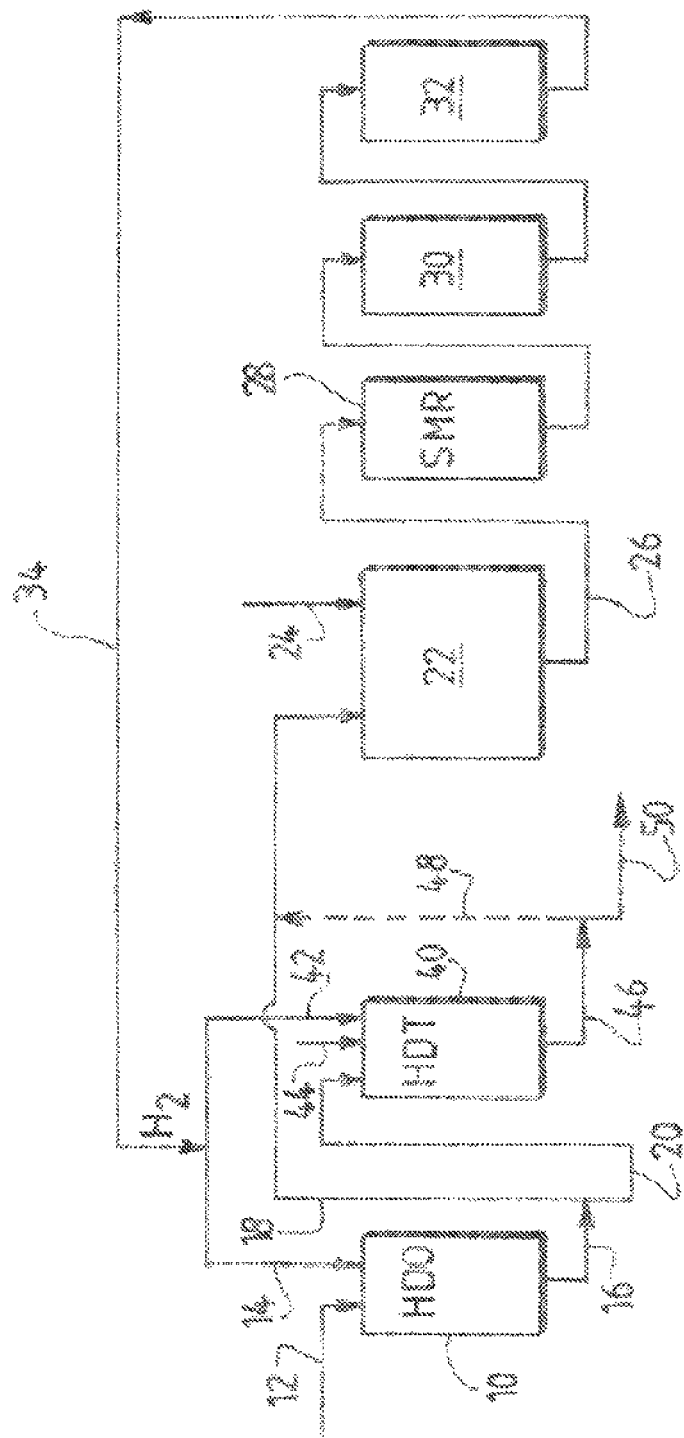

FIG. 2. gives a representation of a simplified scheme of a preferred embodiment of the process.

The present invention provides a pyrolysis oil HDO process capable of operating continuously without exhibiting the disadvantages of the processes known to date: risk of coking of the catalyst, blockages and need to halt the HDO reaction in order to clean the reactor.

The HDO process which is a subject matter of the invention consists in operating with a catalytic system comprising a plurality of catalytic beds arranged in series and distributed in one or more reactors, which system is equipped with means for controlling the temperature and is characterized by:

the injection of the pyrolysis oil at the top of the $1^{st}$ catalytic bed, the fractional injection of the hydrogen:

the $1^{st}$ injection of hydrogen is carried out at the top of the $1^{st}$ catalytic bed, the other injection or injections of $H_2$ being carried out between 2 catalytic beds and being chosen so that the difference between the temperatures for successive injections of $H_2$ does not exceed 50° C. ($\Delta Tmax$ (rank (n+1) $H_2$ injection temperature−rank (n) $H_2$ injection temperature≤50° C.), preferably $\Delta Tmax$≤20 to 30° C.

The term "$H_2$ injection temperature" is understood to mean the local temperature inside the reactor at the level of the corresponding $H_2$ injection. The $H_2$ injections are generally carried out between the catalytic beds of the reactor.

The difference in temperature $\Delta Tmax$ thus corresponds to the variation in temperature of the catalytic bed located between two successive $H_2$ injections.

The variations in temperature within the reactor originate from the exothermicity of the reaction between $H_2$ and the pyrolysis oil; the present invention makes it possible to control the exothermicity by controlling the temperature of the $H_2$ stream injected and/or the flow rate of this $H_2$ stream.

Advantageously, the variation in temperature $\Delta Tmax$ between two catalytic beds is obtained by controlling the flow rate and/or temperature conditions of the $H_2$ streams injected between said catalytic beds.

The temperature of the $H_2$ stream injected is generally ambient temperature but it can be greater or less than ambient temperature.

The difference in temperature $\Delta Tmax$ (rank (n+1) $H_2$ injection temperature−rank (n) $H_2$ injection temperature) can be zero, indeed even negative, if the $H_2$ injection temperature with the rank n+1 is lower than the $H_2$ injection temperature with the rank n.

The target $\Delta T$ between two $H_2$ injections corresponds to a variation in temperature meeting the conditions defined above for $\Delta Tmax$.

The amount of hydrogen injected into a bed (corresponding to the amount of hydrogen injected upstream of this bed) is preferably equal to the stoichiometric amount necessary to achieve a target $\Delta T$ in this bed; the supply of heat can originate from the exothermicity of the HDO reactions.

Preferably, the amount of hydrogen injected at the top of the $1^{st}$ bed does not exceed a maximum value such that the partial water pressure at the reaction temperature is too low to keep the water in the liquid state (that the water from the pyrolysis oil does not evaporate).

It would not be departing from the scope of the invention to replace all or part of the biomass pyrolysis oil with the ligneous organic phase resulting from the separation of biomass pyrolysis oil to which water has been added, this separation resulting in 2 phases: a light aqueous phase (with a density less than that of the pyrolysis oil) and a ligneous organic phase or phase rich in pyrolytic lignin.

The pressure within the hydrodeoxygenation reactor or reactors is generally between 5 and 20 MPa, preferably between 10 and 15 MPa. The high pressures make possible generally a greater injection of hydrogen between each bed and result in a reactor design comprising fewer catalytic beds with higher exothermicities.

The use of high pressures makes it possible generally to promote the HDO reaction and to avoid as much as possible the formation of coke on the hydrotreating catalysts and also to reduce the rate of the polymerization reactions of the pyrolysis oil in comparison with the HDO reactions.

In general, the inlet temperature of the $1^{st}$ catalytic bed (where a portion of the hydrogen and the pyrolysis oil are brought into contact) is between 120 and 180° C., preferably between 140 and 160° C. This inlet temperature of the $1^{st}$ catalytic bed can be controlled by the temperature and/or the flow rate of the $H_2$ injection at the top of the $1^{st}$ catalytic bed.

In general, the outlet temperature of the final catalytic bed is between 320 and 380° C. when an extensive HDO (conversion>90%) or total HDO (100%) is desired. This outlet temperature of the final catalytic bed is controlled by the temperature and/or the flow rate of the different injections of $H_2$.

In general, the outlet temperature of the final catalytic bed is between 180 and 320° C. when a partial HDO is desired (between 10 and 90% conversion).

By way of example, in the case where the process according to the invention comprises 2 injections of hydrogen, if the $1^{st}$ $H_2$ injection is carried out at a temperature of 130° C., the remainder of the hydrogen will be injected between 2 beds at a point where the temperature inside the reactor does not exceed 180° C. (130+50) and advantageously where the temperature does not exceed 150/160° C. ((130+20)/(130+30)).

By way of example, in the case where the process according to the invention comprises 3 injections of hydrogen, if the $1^{st}$ injection of $H_2$ is carried out at a temperature of 150° C., the $2^{nd}$ injection of hydrogen will be carried out between 2 beds at a point where the temperature inside the reactor does not exceed 200° C. (150+50) and advantageously does not exceed 170/180° C. ((150+20)/(150+30)), and the $3^{rd}$ injection will be carried out between 2 beds at a temperature inside the reactor which does not exceed by more than 50° C. (preferably does not exceed by more than 20 to 30° C.) the temperature inside the reactor of the $2^{nd}$ injection of $H_2$.

For an extensive or total HDO, the total amount of hydrogen injected into the reactor or reactors which is necessary in the HDO process according to the invention is generally greater than the stoichiometric requirements of the HDO reactions (generally from 2 to 7% by weight per weight of pyrolysis oil). The amount of hydrogen injected into a catalytic bed is adjusted as a function of the target ΔT of this bed and thus of the progression of the HDO. The catalysts which can be used in the process of the present invention can be chosen from the catalysts normally used in units for the hydrogenation and hydrotreating of petroleum hydrocarbons. Mention may be made, as example of HDO catalysts, of the catalysts comprising at least one of the metals from Group VI, VII or VIII (Ni, Cr, Mo, W, Co, Rh, Ir, Ru, Pt, Pd, Re, and the like); the metal or metals are preferably deposited on and/or dispersed over supports, such as alumina, silica/alumina, cerium, zirconium, carbon, titanium or zeolite (zeolite beta, zeolite Y, zeolites of MFI type, mordenite, silicalite, SM3 and/or faujasite; see, for example, the catalysts described in WO 2009/126508, page 12 [0028]). The metals may or may not be in the form of oxides; the catalytic support is preferably chosen from porous supports having a high specific surface, for example γ-alumina, active charcoal or zeolite. The catalysts can be fresh, regenerated or rejuvenated catalysts.

The catalytic beds can comprise one or more different catalysts which are mixed.

The catalytic beds can be fluidized beds or, advantageously, fixed beds.

The HDO process according to the invention can be carried out in one or more catalytic reactors associated in series: the catalytic beds are thus distributed in several catalytic reactors; the $H_2$ injection carried out at the top of the $2^{nd}$ reactor corresponds to an injection between 2 beds since it is located between the final bed of the $1^{st}$ reactor and the $1^{st}$ bed of the $2^{nd}$ reactor. This arrangement applies mutatis mutandis for the injections at the top of the following reactors.

Within each HDO reactor, the composition of the catalytic beds can be identical or different.

An aqueous liquid phase and an organic phase comprising hydrocarbon compounds are obtained at the outlet of the final catalytic bed of the final HDO reactor.

The HDO reactions can be total or partial. Within the meaning of the present invention,
- the HDO reaction is said to be "total" when the organic phase at the outlet of the final catalytic bed no longer comprises oxygen;
- the HDO reaction is said to be "extensive" when the liquid organic phase resulting from the final HDO catalytic bed comprises less than 10% w/w of the initial amount of oxygen present in the pyrolysis oil employed;
- the HDO reaction is said to be "partial" when the liquid organic phase resulting from the final HDO catalytic bed comprises between 10% and 90% w/w of the initial amount of oxygen present in the pyrolysis oil employed.

The inventors have found that, in their implementational examples of the process according to the invention, in order for the HDO reaction to be "extensive", indeed even "total", it is necessary to have at least 4 separate or distinct $H_2$ injections according to the operating conditions described in detail above, preferably at least 5 and advantageously at least 6.

The organic phase resulting from the HDO process according to the invention as defined above, when it comprises between 0 and 10% w/w of oxygen of the amount of total oxygen present in the starting pyrolysis oil, can advantageously be used, that is to say incorporated, in a gasoline pool or in a refinery for the purpose of the production of liquid fuels of gasoline, jet fuel, kerosene, diesel fuel, domestic heating oil and/or naphtha type, if a finishing treatment proves to be necessary.

Unlike the organic phase obtained by phase separation of pyrolysis oil to which water has been added, the organic phase resulting from the HDO according to the invention is miscible with hydrocarbons: it can thus, if necessary, be advantageously treated in coprocessing with a fossil or fossil mineral feedstock according to a conventional conversion process (hydrotreating, FCC, visbreaking, carbonization) known per se.

Advantageously, the organic phase resulting from the HDO of the biomass pyrolysis oil can represent from 2 up to 30% by weight of the feedstock of a unit of the refining scheme.

Advantageously, the cotreatment (i.e., hydrotreating) with the feedstock of mineral origin will take place after a fractionation of the organic effluent at the outlet of the unit for HDO of the pyrolysis oil into several fractions having separate distillation ranges, in particular gas oil, kerosene, jet fuel, gasoline, domestic heating oil and/or naphtha fractions.

The fraction of gas oil type resulting from the fractionation of the organic phase resulting from the HDO can, for example, be hydrotreated with a mineral feedstock of gas oil type which can result from the atmospheric distillation of crude oil (gas oil straight run) or from a vacuum distillation of the atmospheric residue (vacuum gas oil) and/or a feedstock of gas oil type resulting from a conversion process. The fact of being able to use an existing unit for the hydrotreating stage makes it possible to considerably reduce the costs.

Likewise, after fractionation, the fraction of kerosene type and the fraction of gasoline type resulting from the HDO of the pyrolysis oil can, if necessary, be cotreated in a conventional hydrotreating unit with a feedstock of kerosene type and a feedstock of gasoline type respectively.

The heavy organic phase resulting from the HDO process according to the invention ($1^{st}$ stage) may require another hydrotreating (for example a conventional hydrodeoxygenation process known per se) in order to produce fuel bases if its oxygen concentration represents more than 10% w/w of the amount.

When the organic phase resulting from the HDO process according to the invention as defined above comprises between 10% and 90% w/w of the initial amount of oxygen present in the pyrolysis oil, this organic phase can be used as is in a refinery for the purpose of the production of liquid fuels by a treatment in a conversion unit defined above. This organic phase can also be used as source of oxygen-comprising chemical intermediates which are compounds having, for example, one or more functional groups, such as aldehyde and/or ketone and/or acid and/or alcohol, and the like.

The aqueous phase obtained after the aqueous HDO process is said to be "light" as it has a density lower than that of the starting pyrolysis oil. It comprises less in the way of heavy products and sulfur than the aqueous phase resulting from the physical separation of the pyrolysis oil to which water has been added.

The invention also relates to a process for upgrading pyrolysis oil and/or the ligneous organic phase resulting from the phase separation of biomass pyrolysis oil to which water has been added to give liquid fuels, which process is capable of operating continuously and comprises the following stages:
- extensive or total HDO of pyrolysis oil and/or of the ligneous organic phase resulting from the phase separation of biomass pyrolysis oil to which water has been added, according to the HDO process as defined above (1st stage), followed by separation of the liquid effluent obtained into a light aqueous fraction and a heavy organic fraction;
- prereforming the "light" aqueous fraction and treating the "light" aqueous fraction in an SMR unit in order to produce hydrogen;
- hydrotreating said "heavy" organic fraction resulting from the HDO, optionally in combination with conventional refinery fuel bases.

The "light" aqueous phase obtained after the HDO process according to the invention comprises water-soluble hydrocarbon products generally having no more than 6 or 7 carbon atoms. These hydrocarbon products can be converted virtually completely, indeed even completely, into methane and $CO_2$ during a prereforming stage carried out at temperatures (much) lower than those employed for the subsequent steam methane reforming (SMR). This process, which combines prereforming and steam reforming, exhibits the advantage of preventing the formation of coke.

As the aqueous phase obtained on conclusion of the HDO process according to the invention comprises less in the way of heavy products and sulfur (known to poison steam reforming catalysts and removed in the form of $H_2S$ during the HDO) than the aqueous fraction obtained by a simple phase separation after addition of water to pyrolysis oil, it can be sent to the prereformer without an additional purification stage.

The prereforming of the aqueous phase makes it possible in particular to convert the $C_{2+}$ compounds into $CH_4$, $CO$, $CO_2$ and $H_2$ in the presence of a conventional prereforming catalyst, in particular a conventional catalyst for an LPG/naphtha prereformer, for example of Ni, or NiO type. This reaction is generally carried out in a conventional fixed bed.

The effluent exiting from the prereformer is then sent to a conventional SMR unit (acronym for "Steam Methane Reforming"), steam being added in order to produce $H_2$. This reaction is generally carried out in numerous catalyst-filled tubes positioned in a furnace.

The simplified reactions occurring in the prereformer can be schematicized by the following chemical equations:

$$C_xH_yO_z + (x-z) H_2O \leftrightarrow (x+y/2-z) H_2 + xCO \quad (1)$$

$$CO + 3H_2 \leftrightarrow CH_4 + H_2O \quad (2)$$

$$CO + H_2O \leftrightarrow CO_2 + H_2 \quad (3)$$

Balance:

$$C_xH_yO_z + (x-y/4-z/2) H_2O \leftrightarrow (x/2+y/8-z/4) CH_4 + (x/2-y/8+z/4) CO_2 \quad (4)$$

The prereforming can be carried out at a temperature of 225 to 450° C., under a pressure of 0.1 to 3 MPa (the use of high pressures is not in general favorable from a thermodynamic view point but makes it possible to reduce the size of the reactors and thus to limit the capital costs). The temperature range under consideration makes it possible to be positioned in a favorable thermodynamic domain and to avoid the reactions which result in the formation of coke. The reactor under consideration can be of the fluidized bed or fixed bed type, preferably of fixed bed type.

The prereforming is preferably carried out with a high water/HC feedstock molar ratio of 10 to 15. This ratio is higher than required by the thermodynamics of the reaction (approximately 3 to 4). Thus, it makes it possible both to shift the equilibrium of the reaction towards the production of methane and hydrogen and also to limit the formation of coke. Depending on the water/organics ratio of the light aqueous fraction arriving as feedstock of the prereformer, water will be added in order to obtain a water/oxygen-comprising compound ratio which will preferably be in the vicinity of 13.

The reaction which takes place in the SMR is as follows:

$$CH_4 + H_2O \leftrightarrow CO + 3H_2.$$

The steam reforming can be carried out at a temperature of 600-900° C., under a pressure of 0.1 to 3 MPa (the use of high pressures is not generally favorable from a thermodynamic view point but makes it possible to reduce the size of the reactors and thus to limit the capital costs). The steam reforming will preferably be carried out with a water/HC feedstock molar ratio of 3 to 4. Typically, the steam reforming is carried out in many small tubes (several hundred) filled with catalyst.

Provision may also be made for a stage of catalytic conversion of the residual CO, optionally followed by a stage of purification of the hydrogen, after the stage of treatment of the effluent in the SMR unit.

The stage of catalytic conversion in the residual CO is obtained by shifting (water gas shift) the following equilibrium in favor of the formation of $CO_2$:

$$CO + H_2O = CO_2 + H_2.$$

This shifting is promoted at low temperature and with a high water/C ratio.

The purification of the hydrogen can, for example, be carried out by the PSA (Pressure Swing Adsorption) process based on the adsorption of the impurities on molecular sieves.

Advantageously, the hydrogen produced from the SMR of the light aqueous fraction can be used for the hydrodeoxygenation of the pyrolysis oil and/or for the hydrotreating of a heavy organic fraction.

The external supply of hydrogen necessary for the hydrodeoxygenation (HDO) and/or hydrotreating (HDT) reactions is thus greatly reduced and may possibly be dispensed with during operation of the plant, depending on the composition and the amount of aqueous fraction.

For example, with a light aqueous fraction containing 50% water and 50% organic compounds, the amount of $H_2$ produced is sufficient to cover the $H_2$ requirements of the HDO of the pyrolysis oil. An external supply of $H_2$ is then only necessary at the start up of the plant, before the beginning of $H_2$ production.

The effluent resulting from the hydrotreating of the heavy organic fraction can also be separated into a light aqueous fraction and a heavy organic fraction when the amount of aqueous fraction is sufficiently high to be able to be separated, this light aqueous fraction then being sent to the prereforming with the light aqueous fraction resulting from the hydrodeoxygenation of the pyrolysis oil: the production of hydrogen can then be enhanced.

With the process for the upgrading of pyrolysis oil according to the invention, all of the pyrolysis oil is upgraded, making possible in particular the production of hydrogen and fuel bases of the following types: LPG (Liquefied Petroleum Gas), gasoline, kerosene, gas oil, vacuum gas oil, and the like.

FIG. 1 gives a representation of a simplified scheme for the operation of the process according to the invention using an HDO reactor (3) comprising a plurality of catalytic beds (4 beds represented) which operate according to the process of claim 1; the means for controlling the temperature are not shown in this scheme.

The pyrolysis oil (1) is introduced at the top of the reactor; the hydrogen is introduced in a fractional manner (2a, 2b, 2c, 2d): at the top of the reactor and upstream of the $1^{st}$ catalytic bed (2a) and then between the catalytic beds (2b, 2c, 2d).

The effluent (4) obtained at the reactor outlet comprises an aqueous phase (6) and an organic phase (7) which are separated by passing through a separator (5); a portion of the organic phase (7) can be recycled in the reactor with the pyrolysis oil (1), as shown in FIG. 1.

FIG. 2 gives a representation of a simplified scheme of a preferred embodiment of the process of claim 11.

The plant comprises an HDO reactor (10) operating according to the HDO process of the invention, which plant is fed with pyrolysis oil (12) and hydrogen (14) (only the $1^{st}$ injection of hydrogen is shown in the scheme). The effluent (16) exiting from the HDO reactor (10) is separated into a light aqueous fraction (18) and a heavy organic fraction (20).

The light aqueous fraction (18) is subsequently introduced as feedstock of a prereformer (22) which is fed with steam (24). The effluent (26) exiting from the prereformer (22) is subsequently sent to an SMR unit (28) in order to produce hydrogen. The residual CO present in the hydrogen can be converted in a water gas shift unit (30) and then the hydrogen is purified in a PSA unit (32) in order to obtain purified hydrogen (34).

The heavy organic fraction (20) is, for example, sent as feedstock of a hydrotreating (HDT) unit (40) if the HDO reaction is extensive or total. Provision may be made to fractionate this heavy organic fraction (20) before it is sent to the HDT unit (40), one of the fractions obtained, for example of the gas oil fraction, being sent back to the HDT.

This HDT unit (40) is fed with $H_2$ (42) and optionally with the feedstock of gas oil type resulting from the HDO of the pyrolysis oil (44). The effluent (46) obtained at the outlet of the HDT (40) can be used as fuel bases of the following types: LPG (liquefied petroleum gas), gasoline, kerosene, gas oil, vacuum gas oil, and the like).

The effluent (46) may also be provided in the form of 2 phases, including a light aqueous fraction (48) and a heavy organic fraction (50). The light aqueous fraction (48) can then be sent as feedstock of the prereformer (22) as required. The heavy organic fraction (50) can advantageously act as fuel or be incorporated in a gasoline pool, as a mixture with bases of fossil or mineral origin (refinery petroleum bases, and the like).

The hydrogen obtained (34) can then be used in a refinery but may preferably be used to feed the HDO unit (10) and/or the HDT unit (40).

The invention claimed is:

1. A process for the catalytic hydrodeoxygenation (HDO) of biomass pyrolysis oil and/or of the ligneous organic phase resulting from the phase separation of biomass pyrolysis oil to which water has been added, using a plurality of catalytic beds arranged in series and distributed in one or more reactors which is/are equipped with temperature controls, comprising
    injecting the pyrolysis oil and/or the ligneous organic phase at the top of the first catalytic bed,
    fractionally injecting hydrogen ($H_2$), wherein:
        the first injection of $H_2$ is carried out at the top of the first catalytic bed, and
        the other injection or injections of $H_2$ being carried out between 2 catalytic beds and being chosen so that the difference between 2 successive $H_2$ injection temperatures does not exceed 50° C., $\Delta Tmax \leq 50°$ C., with $\Delta Tmax = $[rank (n+1) $H_2$ injection temperature]−[rank (n) $H_2$ injection temperature],
    separating the liquid effluents at the outlet of the final catalytic bed into a liquid phase and an organic phase, and
    optionally recycling a portion of the organic phase in the reactor.

2. The process as claimed in claim 1, wherein the pressure in the HDO reactor or reactors is between 5 and 20 MPa.

3. The process as claimed in claim 1, wherein the inlet temperature of the $1^{st}$ catalytic bed is between 120 and 180°C.

4. The process as claimed in claim 1, wherein the variation in temperature $\Delta Tmax$ between two catalytic beds is obtained by controlling the flow rate and/or temperature conditions of the $H_2$ streams injected between said catalytic beds.

5. The process as claimed in claim 1, wherein the HDO catalyst or catalysts of the catalytic beds, which are identical or different, are chosen from the catalysts comprising at least one of the metals from Group VI, VII or VIII.

6. The process as claimed in claim 1, which operates continuously, with a $\Delta Tmax \leq 20$ to 30° C. between each $H_2$ injection.

7. The process as claimed in claim 1, wherein between 90% and 100% of the biomass pyrolysis oil and/or of the ligneous organic phase undergoes catalytic HDO.

8. The process as claimed in claim 7, wherein the outlet temperature of the final catalytic bed is between 320 and 380° C.

9. The process as claimed in claim 1, wherein between 10% and 90% of the biomass pyrolysis oil and/or of the ligneous organic phase undergoes catalytic HDO.

10. A process for the preparation of liquid fuels of renewable or partially renewable origin, of gasoline, jet fuel, kerosene, diesel fuel, domestic heating oil and/or naphtha type, based on biomass pyrolysis oil and/or on the organic phase resulting from the phase separation of biomass pyrolysis oil to which water has been added, which has/have been subjected to an HDO treatment as defined in claim 7.

11. A process for the preparation of chemical intermediates based on pyrolysis oil which has been subjected to HDO treatment as defined in claim 9.

12. A process for upgrading pyrolysis oil and/or the ligneous organic phase resulting from the phase separation of biomass pyrolysis oil to which water has been added to give liquid fuels, comprising the following stages:
    conducting HDO of pyrolysis oil and/or of the ligneous organic phase resulting from the phase separation of biomass pyrolysis oil to which water has been added, wherein greater than 90% of the biomass pyrolysis oil and/or of the ligneous organic phase undergoes catalytic HDO according to the HDO process of claim 1, followed by separation of liquid effluent obtained into a light aqueous fraction and a heavy organic fraction;

prereforming the "light" aqueous fraction and treating the "light" aqueous fraction in a steam methane reforming (SMR) unit in order to produce hydrogen;

hydrotreating said "heavy" organic fraction resulting from the HDO, optionally in combination with conventional refinery fuel bases.

13. The process as claimed in claim 1, wherein the amount of $H_2$ injected into a bed is equal to the stoichiometric amount necessary to achieve a target $\Delta T$ in that bed, and/or the amount of $H_2$ injected at the top of the first bed is such that water of the pyrolysis oil is not evaporated.

14. The process as claimed in claim 1, comprising recycling a portion of the organic phase in the reactor.

15. The process as claimed in claim 14, wherein said recycled portion of the organic phase is reinjected with the pyrolysis oil.

16. The process as claimed in claim 2, wherein the pressure in the HDO reactor or reactors is between 10 and 15 MPa.

17. The process as claimed in claim 3, wherein the inlet temperature of the first catalytic bed is between 140 and 160° C.

18. The process as claimed in claim 5, wherein the metal or metals are deposited on and/or dispersed over a support chosen among aluminia, silica/alumina, cerium, zirconium, carbon, titanium or zeolite.

19. The process as claimed in claim 7, comprising at least 4 $H_2$ injections.

20. The process as claimed in claim 7, comprising at least 5 $H_2$ injections.

21. The process as claimed in claim 7, comprising at least 6 $H_2$ injections.

22. The process as claimed in claim 9, wherein the outlet temperature of the final catalytic bed is between 180 and 320° C.

23. The process as claimed in claim 10, which is based additionally on base(s) of mineral origin.

\* \* \* \* \*